(12) United States Patent
Summers

(10) Patent No.: US 11,315,314 B1
(45) Date of Patent: Apr. 26, 2022

(54) VIRTUAL VEHICLE GENERATION BY MULTI-SPECTRUM SCANNING

(71) Applicant: State Farm Mutual Automobile Insurance Company, Bloomington, IL (US)

(72) Inventor: Nathan C. Summers, Mesa, AZ (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 17/185,163

(22) Filed: Feb. 25, 2021

Related U.S. Application Data

(63) Continuation of application No. 16/920,266, filed on Jul. 2, 2020, now Pat. No. 10,964,101, which is a continuation of application No. 16/168,260, filed on Oct. 23, 2018, now Pat. No. 10,713,839.

(60) Provisional application No. 62/576,346, filed on Oct. 24, 2017.

(51) Int. Cl.
| | |
|---|---|
| *G06T 17/00* | (2006.01) |
| *G06T 7/55* | (2017.01) |
| *G06T 7/00* | (2017.01) |
| *G06K 9/62* | (2006.01) |

(Continued)

(52) U.S. Cl.
CPC ............ *G06T 17/00* (2013.01); *G06K 9/6202* (2013.01); *G06Q 40/08* (2013.01); *G06T 7/0002* (2013.01); *G06T 7/55* (2017.01); *H04N 5/332* (2013.01); *G06T 2200/08* (2013.01); *G06T 2207/10048* (2013.01); *G06T 2207/10152* (2013.01); *G06T 2207/30252* (2013.01)

(58) Field of Classification Search
CPC .. G06K 9/00664–00704; G06F 3/0481; G06F 3/04817; G06F 9/4443; G06F 3/04847; G06F 11/3664; G06F 3/012; G06F 3/0304; G06F 3/011–015; G06T 19/00; G06T 17/00; G06T 19/006; G06T 2215/16; H04N 5/272; H04N 2201/3245; A63F 13/10
See application file for complete search history.

(56) References Cited

U.S. PATENT DOCUMENTS

| | | |
|---|---|---|
| 7,395,151 B2 | 7/2008 | O'Neill et al. |
| 8,453,219 B2 | 5/2013 | Shuster et al. |
| 8,756,085 B1 | 6/2014 | Plummer et al. |

(Continued)

OTHER PUBLICATIONS

Non Final Office Action dated Aug. 4, 2020 for U.S. Appl. No. 16/920,266, "Virtual Vehicle Generation by Multispectrum Scanning", Summers, 8 pages.

*Primary Examiner* — Todd Buttram
(74) *Attorney, Agent, or Firm* — Lee & Hayes, P.C.

(57) ABSTRACT

A method and system for generating a three-dimensional representation of a vehicle to assess damage to the vehicle. A mobile device may capture multispectral scans of a vehicle from each a plurality of cameras configured to scan the vehicle at a different wavelength of the electromagnetic spectrum. A virtual model of the vehicle may be generated from the multispectral scan of the vehicle, such that anomalous conditions or errors in individual wavelength data are omitted from model generation. A representation of the virtual model may be presented to the user via the display of the mobile device. The virtual model of the vehicle may further be analyzed to assess damage to the vehicle.

20 Claims, 7 Drawing Sheets

(51) Int. Cl.
*G06Q 40/08* (2012.01)
*H04N 5/33* (2006.01)

(56) References Cited

U.S. PATENT DOCUMENTS

| | | | |
|---|---|---|---|
| 9,354,045 B1* | 5/2016 | Best | G01B 11/25 |
| 9,563,201 B1 | 2/2017 | Tofte et al. | |
| 9,721,304 B1 | 8/2017 | Parchment et al. | |
| 10,127,722 B2 | 11/2018 | Shakib et al. | |
| 10,217,168 B2 | 2/2019 | Tofte et al. | |
| 10,459,706 B1 | 10/2019 | Little et al. | |
| 10,713,839 B1* | 7/2020 | Summers | G06T 7/55 |
| 10,964,101 B1* | 3/2021 | Summers | G06K 9/209 |
| 2004/0193441 A1 | 9/2004 | Altieri | |
| 2009/0138290 A1 | 5/2009 | Holden | |
| 2009/0225001 A1 | 9/2009 | Biocca et al. | |
| 2011/0218825 A1 | 9/2011 | Hertenstein | |
| 2012/0019522 A1 | 1/2012 | Lawrence et al. | |
| 2012/0076437 A1 | 3/2012 | King | |
| 2012/0096384 A1 | 4/2012 | Albert et al. | |
| 2012/0155719 A1 | 6/2012 | Yun et al. | |
| 2014/0119648 A1 | 5/2014 | Park et al. | |
| 2015/0268058 A1 | 9/2015 | Samarasekera et al. | |
| 2016/0061622 A1 | 3/2016 | Ren et al. | |
| 2016/0313736 A1 | 10/2016 | Schultz et al. | |
| 2017/0089710 A1 | 3/2017 | Slusar | |
| 2017/0090460 A1 | 3/2017 | Andrew et al. | |
| 2017/0148102 A1* | 5/2017 | Franke | G06Q 30/0278 |
| 2017/0192631 A1 | 7/2017 | Lee et al. | |
| 2017/0251143 A1 | 8/2017 | Peruch et al. | |
| 2017/0277951 A1* | 9/2017 | Wagner | G01S 17/89 |
| 2017/0278409 A1* | 9/2017 | Johnson | G08G 5/0026 |
| 2017/0359712 A1 | 12/2017 | Meredith et al. | |
| 2018/0003516 A1 | 1/2018 | Khasis | |
| 2018/0004498 A1 | 1/2018 | Meyer | |
| 2018/0040039 A1* | 2/2018 | Wells | G06Q 30/0283 |
| 2018/0165616 A1 | 6/2018 | Sun et al. | |
| 2018/0190132 A1* | 7/2018 | Cronkhite | G06K 9/0063 |
| 2019/0014319 A1* | 1/2019 | Jannard | H04N 19/13 |
| 2019/0095877 A1* | 3/2019 | Li | G06Q 10/20 |
| 2019/0095963 A1* | 3/2019 | Martin | G06Q 30/0278 |
| 2019/0102752 A1* | 4/2019 | Valenti | G06Q 30/0627 |

\* cited by examiner

VIRTUAL VEHICLE GENERATION BY MULTI-SPECTRUM SCANNING

CROSS-REFERENCE TO RELATED APPLICATIONS

This application is a continuation of, and claims priority to, U.S. application Ser. No. 16/920,266, filed on Jul. 2, 2020, which is a continuation of, and claims priority to, U.S. application Ser. No. 16/168,260, filed on Oct. 23, 2018, now U.S. Pat. No. 10,713,839, issued Jul. 14, 2020, which claims priority to and the benefit of U.S. Provisional Patent Application No. 62/576,346, filed on Oct. 24, 2017, the entire contents of which are hereby expressly incorporated herein by reference.

TECHNICAL FIELD

The present disclosure generally relates to a system and a method for assessing damage to a vehicle by capturing a multispectral scan of the vehicle in a virtual environment and generating a virtual image of a vehicle.

BACKGROUND

Generally, vehicles get damaged by collisions, misuse, extreme weather, etc. The extent of damage to a vehicle can be documented by scanning the vehicle with a camera. However, in some cases, the damage may not be easily noticeable when viewing a scan of a damaged vehicle due to component transparency, absorption, reflection, or the like. For example, a window is transparent to visible light, so a completely missing window may look the same in the scan as an undamaged window. As a result, the damage to the window may not be noted in the scan of the damaged vehicle. Improving the accuracy of scanning a damaged vehicle is important for properly assessing the damage to the vehicle.

SUMMARY

The present disclosure generally relates to a system and method for assessing damage to a vehicle by generating a virtual image of a vehicle. Various aspect of example techniques are summarized below, which may include additional, less, or alternate actions, including those discussed elsewhere herein.

In one aspect, a computer-implemented method of generating a three-dimensional representation of a vehicle to assess damage to the vehicle may be provided. The method may include (1) capturing a plurality of data points comprising a multispectral scan of the vehicle. The plurality of data points may be captured by one or more cameras disposed within or connected to a mobile device. In some embodiments, a plurality of cameras may be used such that each of the plurality of cameras is configured to scan the vehicle at a different wavelength range of the electromagnetic spectrum. The method may also include (2) generating a virtual model of the vehicle in three dimensions based on the multispectral scan of the vehicle; (3) presenting the virtual model of the vehicle to a user of the mobile device; and (4) analyzing the virtual model of the vehicle to assess the damage to the vehicle.

One or more of the cameras may be removable connected to the mobile device. Additionally, the one or more cameras may capture scans of the vehicle using at least three different wavelength ranges of the electromagnetic spectrum, including at least one of each of the following wavelength ranges: a wavelength range in the visible spectrum, a wavelength range in the infrared spectrum, and a wavelength range in a third spectrum that is neither the visible spectrum nor the infrared spectrum. Further, one or more of the plurality of cameras may include a fisheye lens.

The method may further include (a) determining apparent distances from the mobile device of the plurality of data points captured by the one or more cameras; (b) identifying a divergence between apparent distances for corresponding data points in at least two wavelength ranges; (c) selecting one of the corresponding data points associated with a shortest apparent distance from the vehicle; and (d) generating the virtual model based upon the selected one of the corresponding data points.

At least a portion of the virtual model of the vehicle may be compared to at least a portion of a baseline virtual model representing a three-dimensional model of an associated vehicle without damage. One or more clusters of data points may be identified in the virtual model that differ from corresponding clusters of data points in the virtual baseline model by at least a threshold amount and one or more vehicle components associated with the corresponding clusters may be identified as the damaged vehicle components.

The method may further include (a) determining a cost associated with the damage to the vehicle; (b) determining an insurance claim based on the cost associated with the damage to the vehicle; (c) presenting an indication of the insurance claim to the user for review or approval; (d) transmitting, from the mobile device to a remote server via a network connection, the multispectral scan of the vehicle; and (e) transmitting, from the remote server to the mobile device via the network connection, the indication of the insurance claim.

In another aspect, a computer system for generating a three-dimensional representation of a vehicle to assess damage to the vehicle may be provided. The computer system may include (1) one or more processors; (2) one or more cameras communicatively connected to the one or more processors; (3) one or more displays communicatively connected to the one or more processors; and (4) a non-transitory program memory communicatively coupled to the one or more processors and storing executable instructions that, when executed by the one or more processors, cause the computer system to: (a) capture a plurality of data points comprising a multispectral scan of the vehicle using the one or more cameras to scan the vehicle at a plurality of different wavelength ranges of the electromagnetic spectrum; (b) generate a virtual model of the vehicle in three dimensions based on the multispectral scan of the vehicle; (c) present the virtual model of the vehicle to a user via the one or more displays; and (d) analyze the virtual model of the vehicle to assess the damage to the vehicle.

In yet another aspect, a tangible, non-transitory computer-readable medium storing executable instructions for generating a three-dimensional representation of a vehicle to assess damage to the vehicle may be provided. The tangible, non-transitory computer-readable medium may include instructions executable by at least one processor of a computer system that, when executed by the at least one processor of the computer system, cause the at least one processor to (1) capture a plurality of data points comprising a multispectral scan of the vehicle via one or more cameras of a mobile device at a plurality of different wavelength ranges of the electromagnetic spectrum; (2) generate a virtual model of the vehicle in three dimensions based on the multispectral scan of the vehicle; (3) cause the virtual model of the vehicle to be presented to a user of the mobile device; and (4) analyze the virtual model of the vehicle to assess the damage to the vehicle.

Advantages will become more apparent to those of ordinary skill in the art from the following description of the preferred aspects which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

The figures described below depict various aspects of the applications, methods, and systems disclosed herein. It should be understood that each figure depicts an embodiment of one or more particular aspects of the disclosed applications, systems and methods, and that each of the figures is intended to accord with one or more possible embodiments thereof. Furthermore, wherever possible, the following description refers to the reference numerals included in the following figures, in which features depicted in multiple figures are designated with consistent reference numerals.

DETAILED DESCRIPTION

Figure 1:
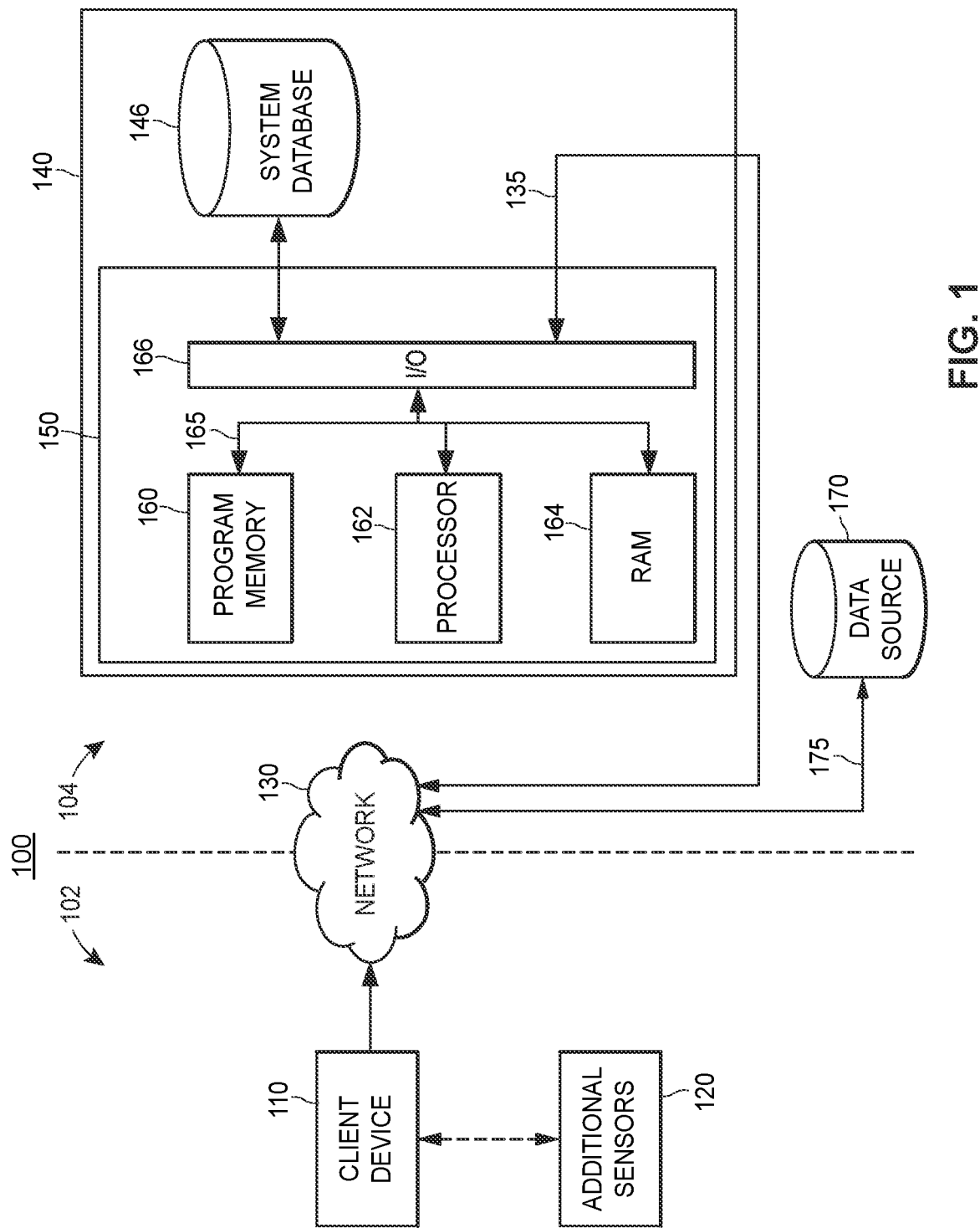
FIG. 1 illustrates a block diagram of an exemplary virtual vehicle damage assessment system on which the methods described herein may operate in accordance with the described embodiments.

The systems and methods relate to, inter alia, generating a three-dimensional representation (i.e., virtual model) of a vehicle to assess damage to the vehicle, which may be used to determine whether components of the vehicle are damaged and costs to replace each component. Conventionally, a scan from a camera that captures images and videos in the visible portion of the electromagnetic spectrum is used to record damage to a vehicle. However, images and videos from the visible portion of the electromagnetic spectrum do not accurately record all damage to the vehicle in some situations. Therefore, scans from cameras that capture images and videos in other portions of the electromagnetic spectrum may be used to more accurately assessing the damage to a vehicle, as described herein.

The aspects described herein leverage scans of a damaged vehicle captured in different portions of the electromagnetic spectrum to generate an accurate virtual model of a damaged vehicle. In particular, scans of the damaged vehicle from three or more different portions of the electromagnetic spectrum are captured. In some embodiments, scans from the visible spectrum, infrared spectrum, and a third spectrum that is neither the visible spectrum nor the infrared spectrum (e.g., ultraviolet, x-ray, etc.) may be captured to generate a virtual model of the damaged vehicle. For example, a combination of scans in the visible spectrum, infrared spectrum, and microwave spectrum may be used to capture data for generating the virtual model. In other embodiments, scans from different ranges may be used, such as the near-infrared range, far-infrared range, and short-wavelength microwave range. In some embodiments, separate scans from multiple ranges within one of these spectrums may be used. For example, both near-infrared and far-infrared ranges may be used to obtain more accurate data for the various types of materials used in a vehicle.

Additionally, a baseline virtual model of the undamaged vehicle based on scans of the undamaged vehicle for the three different spectra described above may also be available. The virtual model for the damaged vehicle may be compared to the baseline virtual model for the same make and model of vehicle to accurately determine the areas of the vehicle that are damaged. For example, the baseline virtual image may be subtracted from the virtual image of the damaged vehicle to determine which data points (or clusters of data points) have high differential values, and thus, most likely represent an area of the vehicle that is damaged.

The systems and methods described herein improve model-based vehicle damage assessment by scanning a damaged vehicle in multiple wavelength ranges of the electromagnetic spectrum. In contrast to existing techniques, the techniques herein leverage the ability for different wavelength ranges of the electromagnetic spectrum to detect different types of characteristics of vehicle damage. As a result, a more complete assessment of vehicle damage can be determined. For example, glass is transparent to light in the visible and near-infrared spectrums (i.e., shorter wavelengths of the infrared spectrum) but absorbs and reflects light in the mid-infrared and far-infrared spectrums (i.e., longer wavelengths of the infrared spectrum). Undamaged glass would be transparent in the visible and near-infrared spectrums and dark in the mid-infrared and far-infrared spectrums. However, shattered glass (i.e., missing glass) would still appear transparent in the visible spectrum, but also transparent in all ranges of the infrared spectrum. Therefore, when compared to the baseline virtual model of undamaged glass, the virtual model of shattered glass will look different based on the data obtained in the mid-infrared and/or far-infrared spectrum. In other words, without the mid-infrared and/or far-infrared spectrum it would be impossible to tell if the glass was shattered or not because there is no difference with the way undamaged glass and shattered glass looks in the visible and near-infrared spectrums. Other components appear transparent or highly reflective in other wavelength ranges.

The aspects described herein may also support dynamic, real-time, or near real-time (i.e., without a substantial delay beyond ordinary delays in data transmission, access, and processing) analysis of any captured, received, and/or detected data. In particular, a computing device may receive imaging data of a vehicle from multiple wavelength ranges of the electromagnetic spectrum in real-time or near real-time and may process the imaging data to generate a virtual model of the vehicle in real-time or near real-time. In this way, the owner of a vehicle as well as the insurer of the vehicle are afforded the benefit of an accurate representation of the damage to the vehicle.

System Overview

FIG. 1 illustrates a block diagram of an exemplary virtual vehicle damage assessment system 100. The high-level architecture includes both hardware and software applications, as well as various data communications channels for communicating data between the various hardware and software components. The virtual vehicle damage assessment system 100 may be roughly divided into front-end components 102 and back-end components 104. The front-end components 102 allow a user to scan a vehicle and interact with a virtual representation of the vehicle via a mobile computing device 110. The front-end components 102 may communicate with the back-end components 104 via a network 130. The back-end components 104 may include one or more servers 140 that may communicate with the front-end components 102 and/or data sources 170. The servers 140 may perform data processing and/or provide information based upon information received from the front-end components 102, as described further herein. The one or more data sources 170 may be connected to the front-end components 102 or to the servers 140 to provide information for damage assessment via the network 130 via link 175. Such data sources 170 may include databases of costs for repairing or replacing damaged vehicle components. In alternative embodiments, the virtual vehicle damage assessment system 100 may consist of only the front-end components 102, without necessarily connecting to the back-end components 104 via a network 130.

The front-end components 102 may be disposed within one or more mobile computing devices 110, which may include a desktop computer, notebook computer, netbook computer, tablet computer, or mobile device (e.g., smart phone, wearable computer, computer headset, etc.). In a preferred embodiment, the mobile computing device 110 may be a general use smartphone or tablet computer with at least one image capture device (e.g., a digital camera) and a touchscreen display. In some embodiments, the mobile computing device 110 may be a thin-client device, wherein much or all of the computing processes are performed by the server 140, with information communicated between the thin-client mobile computing device 110 and the server 140 via the network 130.

The mobile computing device 110 may include any number of internal sensors and may be further communicatively connected to one or more additional external sensors 120 by any known wired or wireless means (e.g., USB cables, Bluetooth communication, etc.). The one or more additional external sensors 120 may comprise an array of sensors and/or cameras that detect different frequencies ranges of the electromagnetic spectrum (e.g., visible, infrared, ultraviolet, x-ray, etc.). Additionally, in some embodiments, one or more of the additional external sensors 120 may utilize a fisheye lens in which wide panoramic or hemispherical images may be generated. Further, other types of external sensors may be used such as LIDAR, RADAR, and SONAR, for example. Still further, an illumination component (e.g., flash) may accompany the external sensors. The mobile computing device 110 is further discussed below with respect to FIG. 2.

In some embodiments, the front-end components 102 may communicate with the back-end components 104 via the network 130. The network 130 may be a proprietary network, a secure public internet, a virtual private network or some other type of network, such as dedicated access lines, plain ordinary telephone lines, satellite links, cellular data networks, combinations of these, etc. Where the network 130 comprises the Internet, data communications may take place over the network 130 via an Internet communication protocol.

The back-end components 104 may include one or more servers 140 communicatively connected to the network 130 by a link 135. Each server 140 may include one or more processors 162 adapted and configured to execute various software applications and components of the system 100, in addition to other software applications. The server 140 may further include a database 146, which may be adapted to store data related to the system 100, such as data points or virtual models, cost data associated with corresponding vehicle components or repairs, or similar data. The server 140 may access data stored in the database 146. The server 140 may have a controller 150 that is operatively connected to the database 146. It should be noted that, while not shown, additional databases may be linked to the controller 150 in a known manner. The controller 150 may include a program memory 160, a processor 162, a RAM 164, and an I/O circuit 166, all of which may be interconnected via an address/data bus 165. It should be appreciated that although only one microprocessor 162 is shown, the controller 150 may include multiple microprocessors 162. Similarly, the memory of the controller 150 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, or optically readable memories, for example.

The server 140 may further include a number of software applications or routines stored in a program memory 160. In some embodiments, these applications or routines may form modules when implemented by the processor 162, which modules may implement part or all of the methods described below to generate or interact with user interfaces of the mobile computing device 110 or to generate vehicle damage assessment data based upon information from the mobile computing device 110. In some embodiments, such modules may include one or more of a configuration module, an analysis module, or a response module. In further embodiments, the various software applications may include a web server application responsible for generating data content to be included in web pages, including web pages sent from the server 140 to the mobile computing device 110 or to other computing devices for storage or review.

The back-end components 104 may further include one or more data sources 170, communicatively connected to the network 130 via link 175. The data sources 170 may include public or proprietary databases storing information that may be associated with a user of the mobile computing device 110, virtual baseline models of different vehicles, average costs for repairing vehicle components, average costs for replacing vehicle components, or other data related to vehicle damage assessment. Additionally, or alternatively, the data sources 170 may include databases maintained by another entity, such as a manufacturer or reseller of vehicles and vehicle parts. In some embodiments, the data source 170 may further execute software programs or applications as a web server.

Figure 2:
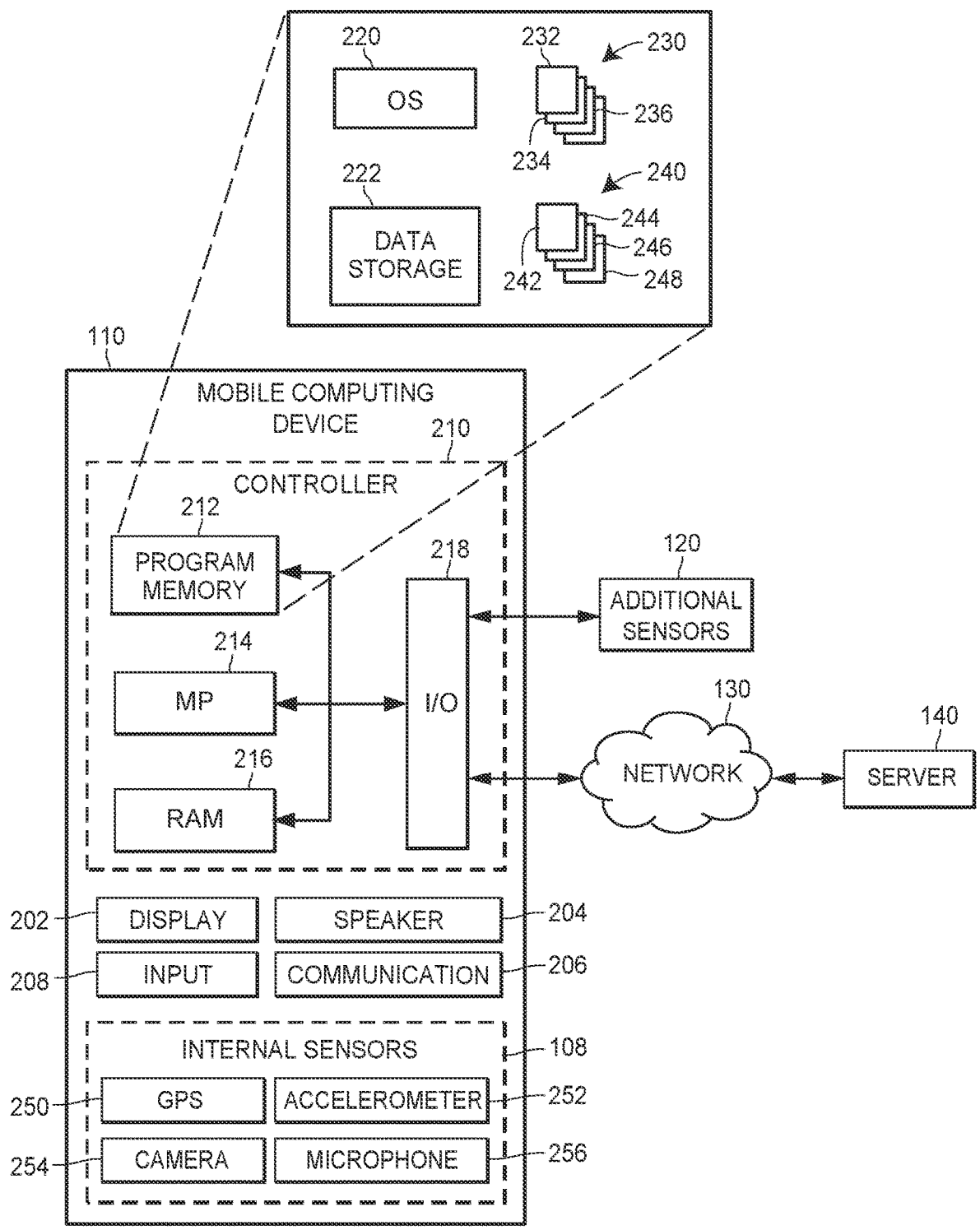
FIG. 2 illustrates a block diagram of an exemplary mobile computing device for use in virtual vehicle damage assessment, in accordance with the embodiments described herein.

FIG. 2 illustrates a block diagram of an exemplary mobile computing device 110 in accordance with the virtual vehicle damage assessment system 100. Such mobile computing device 110 may be a smartphone, a tablet computer, or similar mobile device capable of receiving and processing electronic information. The mobile computing device 110 may include one or more sensors 108, which may provide sensor data regarding a local physical environment in which the mobile computing device 110 is operating. Such sensor data may include 2-D or 3-D images of a vehicle or portions thereof, which may be captured by one or more cameras 254 of the mobile computing device 110. Additionally, in some embodiments, the mobile computing device 110 may receive sensor data from one or more additional external sensors 120. The sensor data may be processed by the controller 210 to generate a virtual model of a vehicle for user interaction, as discussed elsewhere herein. Additionally, or alternatively, the sensor data may be sent to one or more processors 162 of the server 140 through the network 130 for processing.

When the controller 210 (or other processor) generates the virtual model of a vehicle, a representation of the virtual model of the vehicle may be presented to the user of the mobile computing device 110 using a display 202 or other output component of the mobile computing device 110. User input may likewise be received via an input 208 of the mobile computing device 110. Thus, the mobile computing device 110 may include various input and output components, units, or devices. The display 202 and speaker 204, along with other integrated or communicatively connected output devices (not shown), may be used to present information to the user of the mobile computing device 110 or others. The display 202 may include any known or hereafter developed visual or tactile display technology, including LCD, OLED, AMOLED, projection displays, refreshable braille displays, haptic displays, or other types of displays. The one or more speakers 206 may similarly include any controllable audible output device or component, which may include a haptic component or device. In some embodiments, communicatively connected speakers 206 may be used (e.g., headphones, Bluetooth headsets, docking stations with additional speakers, etc.). The input 208 may further receive information from the user. Such input 208 may include a physical or virtual keyboard, a microphone, virtual or physical buttons or dials, or other means of receiving information. In some embodiments, the display 202 may include a touch screen or otherwise be configured to receive input from a user, in which case the display 202 and the input 208 may be combined.

The mobile computing device 110 may further include sensors 108. The sensors 108 may include any devices or components mentioned herein, other extant devices suitable for capturing data regarding a physical environment, or later-developed devices that may be configured to provide data regarding a physical environment (including components of vehicles, structures, or other objects within the physical environment). The sensors 108 of the mobile computing device 110 may be supplemented by additional sensors 120 configured or intended for other uses, such as geolocation, movement tracking, photography, spatial orientation of the device, and capturing scans for the generation of virtual vehicle model. Additionally, the use of more than one camera allows for the ability to obtain three-dimensional stereoscopic in order to analyze depth perception. Such additional sensors may, nonetheless, be used to provide sensor data for capturing data regarding the vehicle to generate a corresponding virtual vehicle, as discussed herein.

Although discussion of all possible sensors of the mobile computing device 110 would be impractical, if not impossible, several sensors warrant particular discussion. Disposed within the mobile computing device 110, the sensors 108 may include a GPS unit 250, an accelerometer 252, a camera 254, and a microphone 256. Any or all of these may be used to generate sensor data used in generating a virtual space representation of the physical environment or items therein. Additionally, other types of currently available or later-developed sensors may be included in some embodiments.

The GPS unit 250 and the accelerometer 252 may provide information regarding the location or movement of the mobile computing device 110. The GPS unit 250 may use "Assisted GPS" (A-GPS), satellite GPS, or any other suitable global positioning protocol (e.g., the GLONASS system operated by the Russian government) or system that locates the position of the mobile computing device 110. For example, A-GPS utilizes terrestrial cell phone towers or Wi-Fi hotspots (e.g., wireless router points) to more accurately and more quickly determine location of the mobile computing device 110, while satellite GPS generally is more useful in more remote regions that lack cell towers or Wi-Fi hotspots. The accelerometer 252 may include one or more accelerometers positioned to determine the force and direction of movements of the mobile computing device 110. In some embodiments, the accelerometer 252 may include a separate X-axis accelerometer, Y-axis accelerometer, and Z-axis accelerometer to measure the force and direction of movement in each dimension respectively. It will be appreciated by those of ordinary skill in the art that a three dimensional vector describing a movement of the mobile computing device 110 through three dimensional space can be established by combining the outputs of the X-axis, Y-axis, and Z-axis accelerometers using known methods.

Similarly, other components may provide additional positioning or movement sensor data. In some embodiments, a gyroscope may be used in addition to, or instead of, the accelerometer 252 to determine movement of the mobile computing device 110. For example, a MEMS gyroscope may be included within the mobile computing device 110 to detect movement of the mobile computing device 110 in three dimensional space. Of course, it should be understood that other types of gyroscopes or other types of movement-detecting sensors may be used in various embodiments. Such sensor data may be used to determine a relative position of the mobile computing device 110 within the physical environment. Such relative position information may be combined with other sensor data (such as visual image data from a camera 254) to provide data from which the mobile computing device 110 can generate a virtual model within a virtual space. For example, multiple two-dimensional (2-D) images of the same object within the physical environment may be compared based upon relative position information to determine the size, distance, and three-dimensional (3-D) shape of the object based upon differences between the images. Likewise, 3-D locations of data points within the virtual space may be determined by one or more sensors (e.g., by triangulation from a plurality of images).

The camera 254 may be used to capture still or video images of the local physical environment of the mobile computing device 110 in the visible spectrum (i.e., approximately 390 nm-700 nm) or other wavelengths, as well as vehicles, other objects, or structures within the local physical environment. Such images may be used to generate and utilize virtual vehicle models in order to facilitate vehicle damage or loss assessment. The one or more cameras 254 may include digital cameras or other similar devices, such as charge-coupled devices, to detect electromagnetic radiation in the visible wavelength range or other wavelengths. It will be readily understood that one or more cameras 254 may be disposed within the mobile computing device 110 and configured to generate either still images or video recordings. For example, multiple cameras 254 may be disposed to obtain stereoscopic images of the physical environment, thereby better enabling the mobile computing device 110 to generate virtual space representations of the physical environment. It will further be understood that many smartphones or tablet computers include front and back solid state digital cameras, which may be used to simultaneously obtain images of a large portion of the area before and behind the phone or tablet. Additional cameras 254 may also be communicatively connected to the mobile computing device 110, including webcams or dashcams. In some embodiments, the camera 254 may include an infrared illuminator or other device to stimulate emission within a targeted range. Such infrared illuminators may be automatically activated when light is insufficient for image capturing. Additional or alternative sensors 108 may be included in some embodiments to capture data regarding locations and shapes of objects within the physical environment.

In some embodiments, additional external sensors 120 may be communicatively connected to the mobile computing device by any known wired or wireless means (e.g., USB cables, Bluetooth communication, etc.). As discussed above, the one or more additional external sensors 120 may consist of an array of sensors and/or cameras that detect different wavelengths ranges of the electromagnetic spectrum (e.g., visible, infrared, ultraviolet, x-ray, etc.). Such sensors and/or cameras may come in the form or charge coupled devices (CCDs), focal plane arrays (FPAs), single element sensors, etc. In some embodiments, one or more of the additional exterior sensors may be designed to detect multiple wavelengths in the same spectrum. Additionally, as discussed above, in some embodiments, one or more of the additional external sensors 120 may utilize a fisheye lens in which wide panoramic or hemispherical images may be generated. In one embodiment, a separate sensor and/or camera is designated for each wavelength range of the electromagnetic spectrum (e.g., one sensor and/or camera for the visible wavelength range, one sensor and/or camera for the infrared wavelength range, etc.). In another embodiment, a sensor and/or camera may incorporate the detection of more than one wavelength range, such as the visible and infrared wavelength ranges, for example. Further, as described above, the use of more than one camera allows for the ability to obtain three-dimensional stereoscopic in order to analyze depth perception. Although described herein as ranges of wavelength or frequencies, it should be understood that specific wavelengths or frequencies may instead be used. One of the skill in the art will understand that capturing data at a specific wavelength also includes capturing data at minutely different wavelengths in a range (however narrow) around the target wavelength. The additional external sensors 120 may also incorporate the functionality of camera 254, as described above.

The microphone 256 may be used to detect sounds within the local physical environment 106, such as spoken notes or comments by the user of the mobile computing device 110. One or more microphones 256 may be disposed within the mobile computing device 110 or may be communicatively connected thereto. For example, wired or wireless microphones 256 may be communicatively connected to the mobile computing device 110, such as wireless speaker/microphone combination devices communicatively paired with the mobile computing device 110.

The mobile computing device 110 may also communicate with the server 140, the data source 170, or other components via the network 130. Such communication may involve the communication unit 206, which may manage communication between the controller 210 and external devices (e.g., network components of the network 130, etc.). The communication unit 206 may further transmit and receive wired or wireless communications with external devices, using any suitable wireless communication protocol network, such as a wireless telephony network (e.g., GSM, CDMA, LTE, etc.), a Wi-Fi network (802.11 standards), a WiMAX network, a Bluetooth network, etc. Additionally, or alternatively, the communication unit 206 may also be capable of communicating using a near field communication standard (e.g., ISO/IEC 18092, standards provided by the NFC Forum, etc.). Furthermore, the communication unit 206 may provide input signals to the controller 210 via the I/O circuit 218. The communication unit 206 may also transmit sensor data, device status information, control signals, or other output from the controller 210 to the server 140 or other devices via the network 130.

The mobile computing device 110 may further include a controller 210. The controller 210 may receive, process, produce, transmit, and store data. The controller 210 may include a program memory 212, one or more microcontrollers or microprocessors (MP) 214, a random access memory (RAM) 216, and an I/O circuit 218. The components of the controller 210 may be interconnected via an address/data bus or other means. It should be appreciated that although FIG. 2 depicts only one microprocessor 214, the controller 210 may include multiple microprocessors 214 in some embodiments. Similarly, the memory of the controller 210 may include multiple RAM 216 and multiple program memories 212. Although the FIG. 2 depicts the I/O circuit 218 as a single block, the I/O circuit 218 may include a number of different I/O circuits, which may be configured for specific I/O operations. The microprocessor 214 may include one or more processors of any known or hereafter developed type, including general-purpose processors or special-purpose processors. Similarly, the controller 210 may implement the RAM 216 and program memories 212 as semiconductor memories, magnetically readable memories, optically readable memories, or any other type of memory.

The program memory 212 may include an operating system 220, a data storage 222, a plurality of software applications 230, and a plurality of software routines 240. The operating system 220, for example, may include one of a plurality of mobile platforms such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage 222 may include data such as user profiles and preferences, application data for the plurality of applications 230, routine data for the plurality of routines 240, and other data necessary to interact with the server 140 through the digital network 130. In some embodiments, the controller 210 may also include, or otherwise be communicatively connected to, other data storage mechanisms (e.g., one or more hard disk drives, optical storage drives, solid state storage devices, etc.) that reside within the mobile computing device 110. Moreover, in thin-client implementations, additional processing and data storage may be provided by the server 140 via the network 130.

The software applications 230 and routines 240 may include computer-readable instructions that cause the processor 214 to implement the virtual vehicle damage assessment functions described herein. Thus, the software applications 230 may include a virtual vehicle model application 232 to generate a virtual model of a damaged vehicle, a vehicle damage assessment application 234 to determine the extent of damage to the vehicle based upon the virtual model of the vehicle and a network communication application 236 to receive and transmit data via the network 130. The software routines 240 may support the software applications 230 and may include routines such as an image capture routine 242 to process image data from the camera 254 and/or additional external sensors 120, a virtual vehicle model generation routine 244 for generating a virtual model of a vehicle based on captured scans from at least three different wavelength ranges of the electromagnetic spectrum, a baseline virtual vehicle model comparison routine 246 for comparing the virtual model of the damaged vehicle to a baseline virtual model of the same, but undamaged vehicle, and vehicle damage assessment routine 248 to calculate the cost of the damage to the vehicle and generate and insurance claim based on the damage to the vehicle. It should be understood that additional or alternative applications 230 or routines 240 may be included in the program memory 212, including web browsers or other applications of the sort ordinarily stored on a mobile device.

In some embodiments, the mobile computing device 110 may include a wearable computing device or may be communicatively connected to a wearable computing device. In such embodiments, part or all of the functions and capabilities of the mobile computing device 110 may be performed by or disposed within the wearable computing device. Additionally, or alternatively, the wearable computing device may supplement or complement the mobile computing device 110. For example, the wearable computing device 110 may be a smart watch or head-mounted display, either of which may include one or more cameras to capture data regarding the physical environment or present representations of the virtual space.

The virtual vehicle damage assessment system 100 described above and illustrated in FIGS. 1-2 may be used to perform the methods discussed further below. Although the following description of exemplary methods discusses aspects of the invention disclosed herein as being performed by the mobile computing device 110 for clarity, it should be understood that part or all of the methods could be performed by any combination of the mobile computing device 110, the server 140, or other devices, in various embodiments. For example, the mobile computing device 110 may be capable of performing all the steps of the methods herein as a stand-alone device, but it may nonetheless be configured in some embodiments to communicate with the server 140 for estimating damage or loss or for preparing or processing insurance claims related to such damage or loss.

Vehicle Scanning

Figure 3A:
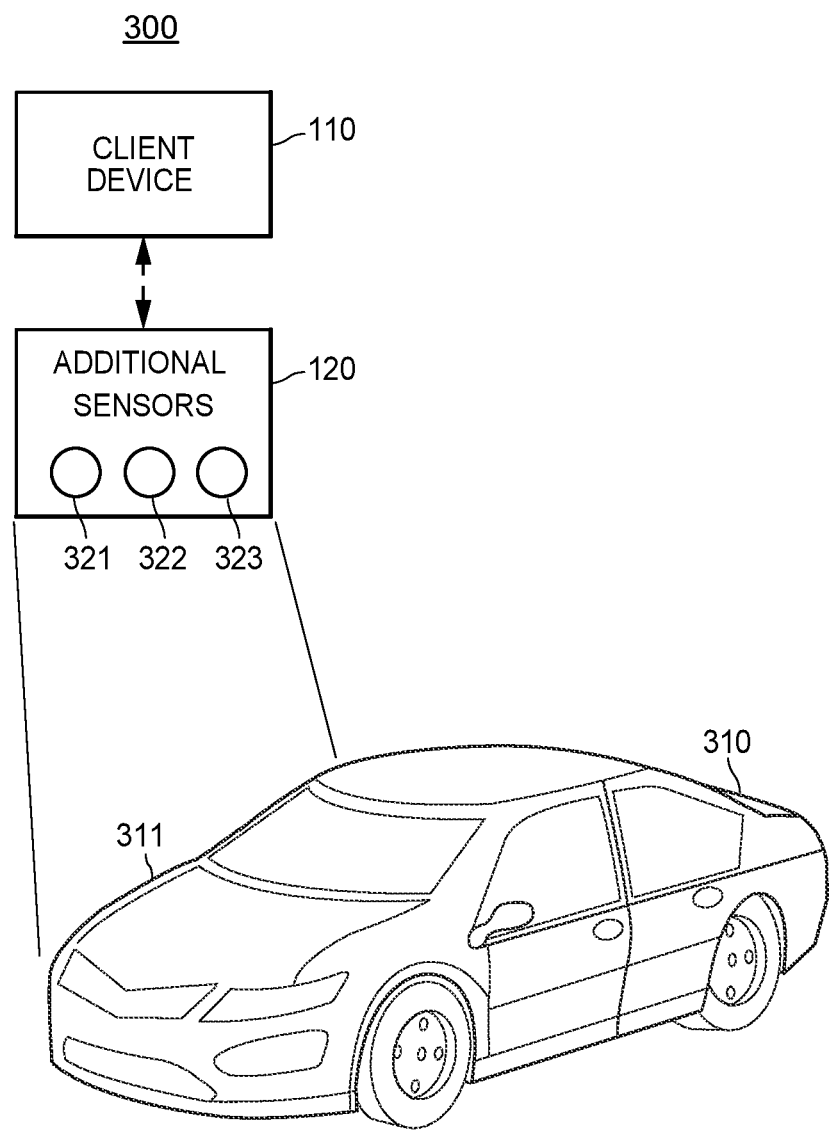
FIG. 3A illustrates an exemplary representation of baseline vehicle scanning.
Figure 3B:
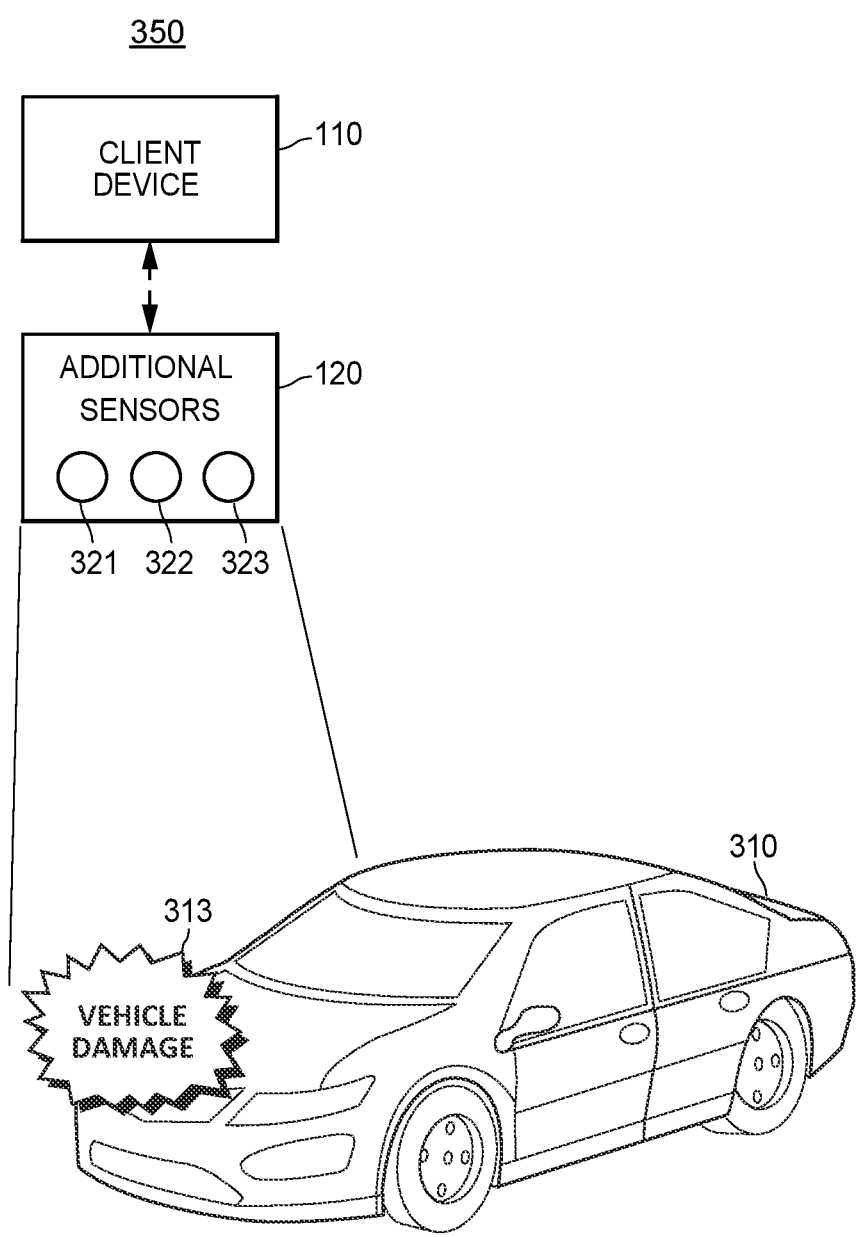
FIG. 3B illustrates an exemplary representation of damaged vehicle scanning.

The system described above may be used, as described further herein, to generate a virtual model of a damaged vehicle based upon a multispectral scan of the damaged vehicle of at least three different wavelengths ranges of the electromagnetic spectrum. To better illustrate the operation of the systems and methods described herein, FIGS. 3A and 3B illustrate exemplary representations of physical environments 300 and 350 respectively. FIG. 3A illustrates an exemplary representation of a baseline vehicle scan and FIG. 3B illustrates an exemplary representation of a damaged vehicle scan. Both of the physical environments 300 and 350 include a mobile computing device 110, such as the mobile computing device 110 as described with respect to FIGS. 1 and 2. Connected to the mobile computing device is an array of additional sensors and/or cameras 120 in the illustrated embodiment. The additional sensors and/or cameras 120 may come in the form of a camera bar having a plurality of digital cameras, with each camera 321-323 having the capability to capture images in a different wavelength range of the electromagnetic spectrum. For example, camera 321 may capture images in the visible wavelength range, camera 322 may capture image in the infrared wavelength range, and camera 323 may capture image in a third wavelength range that is not the visible wavelength range or the infrared wavelength range.

Both physical environments 300 and 350 also include a vehicle 310. In physical environment 300, the vehicle 310 is undamaged while in physical environment 350 the vehicle 310 has damage 313 to the front passenger's side of the vehicle 310. In both physical environments 300 and 350, the additional sensors and/or cameras 120 are directed to scan the front passenger's side of the vehicle 310 by capturing a plurality of data points. The additional sensors and/or cameras 120 of physical environment 300 may scan the undamaged vehicle 310 in order to generate a baseline virtual model of the vehicle 310. In the physical environment 350, the additional sensors and/or cameras may be capturing data points relating to the damage 313 of the damaged vehicle 310 in order to generate a virtual model of the damaged vehicle 310. Because of where the damage 313 is indicated on damaged vehicle 310, the front bumper, right fender, right headlight, etc. may be damaged. Although the vehicle type shown in physical environments 300 and 350 is a sedan, it should be understood that the systems and methods described herein also apply to other types of vehicles (e.g., SUVs, vans, trucks, buses, boats, planes, unmanned aerial vehicles, trains, etc.).

Virtual Model of Damaged Vehicle

To facilitate vehicle damage assessment, a virtual model of the damaged vehicle 310 may be generated that corresponds to and represents the vehicles in the physical environment 350 or a part thereof. The virtual model may be generated as a result of the multispectral scan captured by the cameras 120. After the multispectral scan is captured, the image capture routine 242 may process the image data resulting from the multispectral scan. The virtual vehicle model application 232, in conjunction with the virtual vehicle model generation routine 244, may use the processed image data in order to generate the virtual model of the damaged vehicle 310. Finally, the virtual model of the damaged vehicle 310 may be graphically represented to the user of the mobile computing device 110 as a three-dimensional image presented via the display 202, which may include images of the vehicle.

Figure 4A:
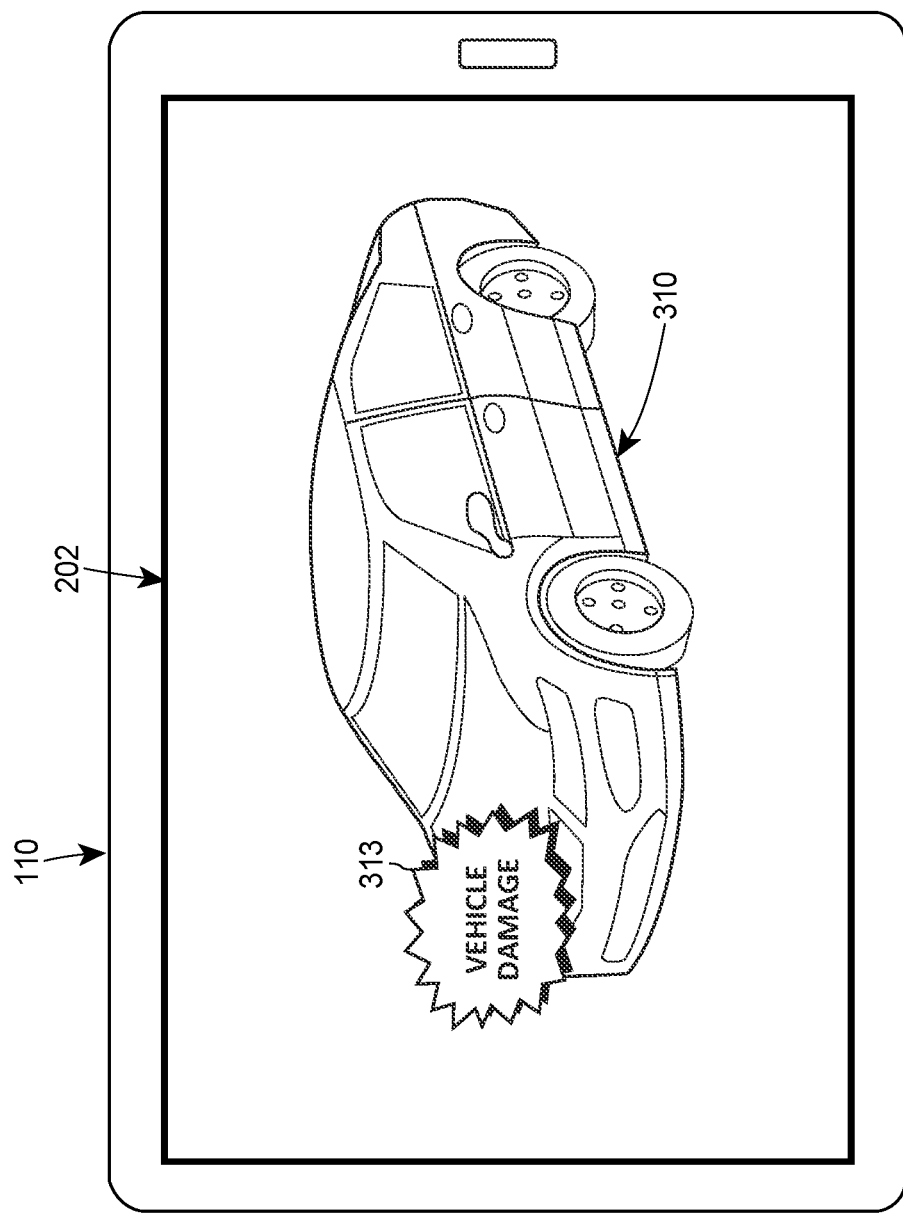
FIG. 4A illustrates an exemplary display presenting the virtual model of the damaged vehicle displayed to a user on the exemplary mobile computing device.

FIG. 4A illustrates an exemplary display presenting the virtual model of the damaged vehicle 310 displayed to a user on the exemplary mobile computing device 101. The display 202 shows the damaged vehicle 310, with the damage 313 located on the front passenger's side of the vehicle. As described above, the location of the damage 313 to the vehicle 310 may indicate that certain components of the vehicle may be damaged, such as the front bumper, right fender, right headlight, etc. Although the damaged vehicle 310 is shown in a specific orientation in FIG. 4A, it should be understood that other display orientations are possible too. For example, the user of the mobile computing device 101 may slide a finger on the display to change the orientation of the virtual model of damaged vehicle 310 on the display 202. For another example, the user may be able to zoom in on specific areas of the damaged vehicle 310 or rotate the virtual model of the damaged vehicle 310. By doing so, all areas of the virtual model of the damaged vehicle 310 may be viewed and all areas of damage to the vehicle may be observed.

After analyzing the virtual model of the damaged vehicle 310, the mobile computing device 110 may utilize the vehicle damage assessment application 234 running the vehicle damage assessment routine 248 to determine any costs related to the damage to the vehicle 310. Costs associated with vehicle repair may include costs of replacement parts and installation costs associated with one or more damaged components of the damaged vehicle 310. Such costs may be determined by automatically identifying damaged components from the virtual model of the damaged vehicle 310, then identifying expected repair costs for such components in the database 146 or other data sources 170. Based on the costs associated with the damage to the vehicle 310, an insurance claim may be determined. Information regarding the insurance claim may be presented to the user via the display 202 of the mobile computing device 110.

Figure 4B:
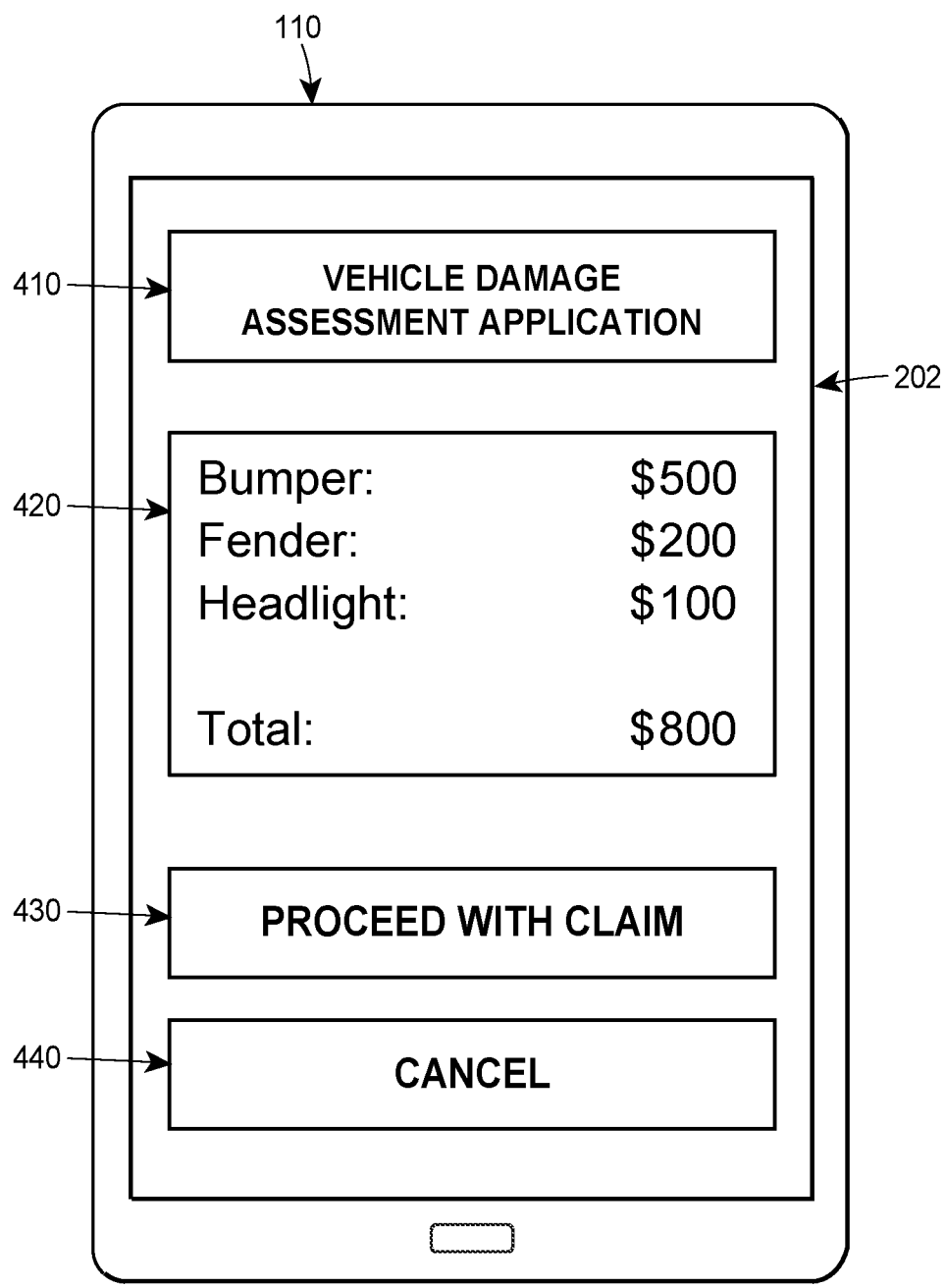
FIG. 4B illustrates an exemplary display presenting a vehicle damage assessment to the user on the exemplary mobile computing device.

FIG. 4B illustrates an exemplary display presenting a vehicle damage assessment to the user on the exemplary mobile computing device 101. As shown in FIG. 4B, display 202 may include an information box 410 that identifies the name of the application ("VEHICLE DAMAGE ASSESSMENT APPLICATION"). Additionally, display 202 may include another information box 420 that identifies the damaged components of vehicle 310 and the costs associated with repairing or replacing each damaged component. Further, the display 202 may include an interactive portion 430, presenting the user with a selectable option to "PROCEED WITH CLAIM," thereby enabling the user to proceed with submitting an insurance claim to an insurance provider. The display 202 may also include an interactive portion 440, presenting the user with a selectable option to "CANCEL," thereby enabling a user to exit the application, to return to a prior screen, to exit to the home screen, etc.

Vehicle Damage Assessment

To further explain the operation of the invention, exemplary methods using a virtual model of a damaged vehicle are described below. The exemplary methods may be implemented by the exemplary virtual vehicle damage assessment system 100 to scan a vehicle, generate a virtual model, and present a representation of the virtual model of the vehicle to a user of a mobile computing device 110, as discussed above. As discussed, a multispectral scan of a damaged vehicle may be captured in order to determined damaged areas and components of a vehicle. Thus, the exemplary methods automatically determine areas and components of the vehicle that are damaged, which improves upon existing measurement techniques and enables automatic vehicle damage assessment. Such exemplary methods enable a mobile computing device user to determine damaged areas and components automatically and accurately, as well as generate an assessment of the extent of damage. The virtual vehicle damage assessment system may then be used by the user for any purpose for which other types of damage estimates or reports may be used, such as filing an insurance claim.

Figure 5:
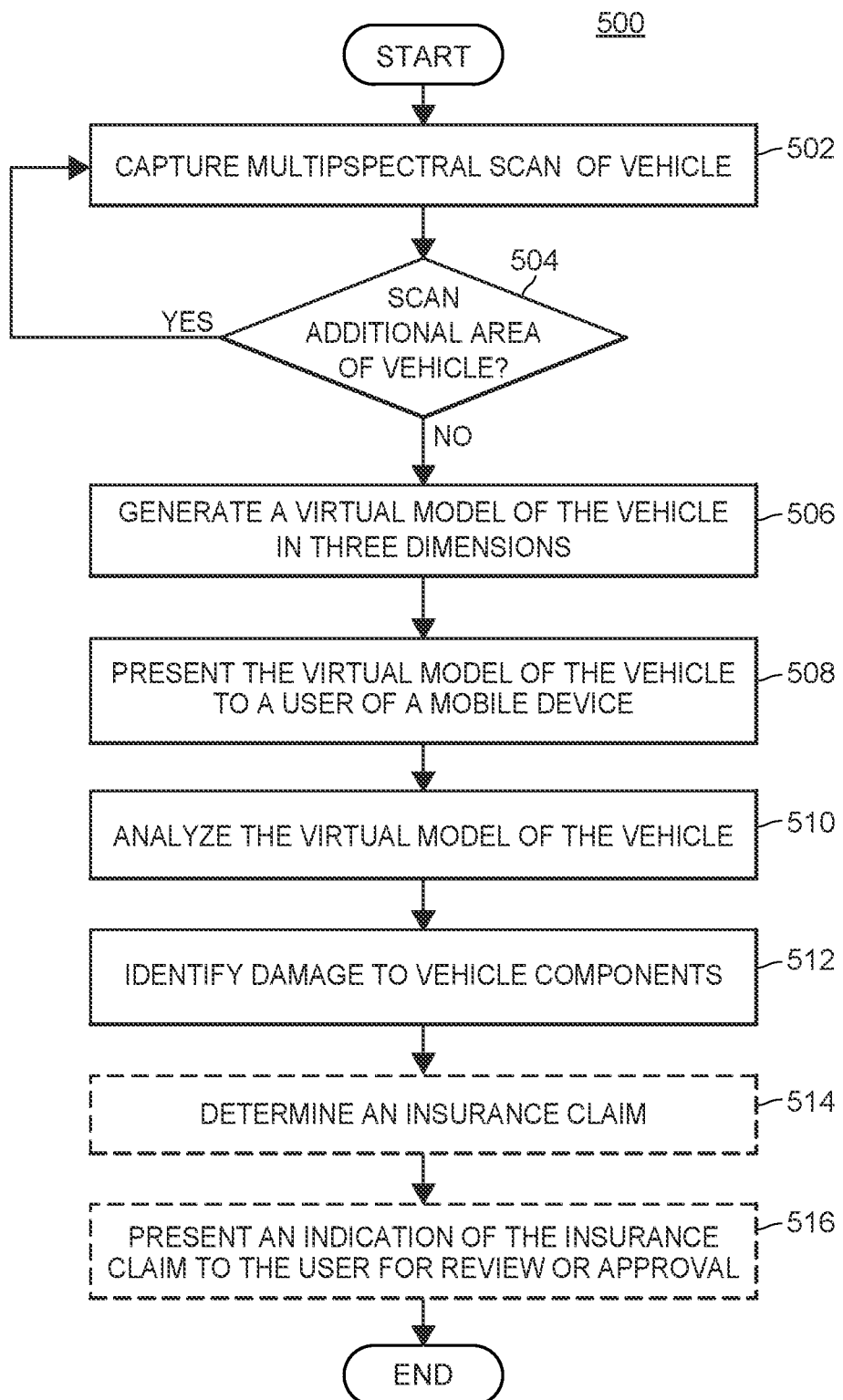
FIG. 5 illustrates a flow diagram of an exemplary virtual vehicle damage assessment method.

FIG. 5 illustrates an exemplary a flow diagram of an exemplary virtual vehicle damage assessment method 500 that may be implemented by the mobile computing device 110. The method may begin upon a user indication, such as by running an application on the mobile computing device 100 to capture a multispectral scan of part or all of the vehicle 310 (block 502) using a plurality of cameras 120 associated with the mobile computing device 110. The multispectral scan may consist of a plurality of data points related to a certain area of the vehicle 310. The mobile computing device may determine whether the user indicates a desire to scan an additional area of the vehicle 310 (block 504). If an additional area of the vehicle 310 is to be scanned, the method 500 may continue by again capturing another multispectral scan of a different area of the vehicle 310 (block 502). Otherwise, the method 500 may continue by generating a virtual model of the vehicle 310 in three dimensions (block 506). Following the generation of the virtual model of the vehicle 310, the display 202 of the mobile computing device 110 may present the virtual model of the vehicle 310 to the user of the mobile computing device 110 (block 508). Additionally, the mobile computing device 110 may analyze the virtual model of the vehicle 310 to assess the damage of the vehicle 310 (block 510). Based upon the analysis of the virtual model of the vehicle 310, the mobile computing device 110 may identify damage to one or more areas and/or components of the vehicle 310 (block 512) and may determine an insurance claim based upon the cost associated with the damage to the vehicle 310 (block 514). The display 202 of the mobile computing device 110 may present an indication of the insurance claim to the user for review or approval (block 516).

At block 502, the virtual vehicle damage assessment method 500 may begin by capturing a multispectral scan of the vehicle 310 using a plurality of cameras 120 associated with the mobile computing device 110. In an embodiment, the multispectral scan consists of a plurality of data points representing a particular area of the vehicle 310. Each of the plurality of cameras 120, such as the cameras 321-323 as described with respect to FIGS. 3A and 3B, may be configured to scan the vehicle 310 at a different wavelength of the electromagnetic spectrum. For example, one camera may capture scans in a wavelength range of the visible portion of the electromagnetic spectrum, another camera may capture scans in a wavelength range of the infrared portion of the electromagnetic spectrum, and the third camera may capture scans in a wavelength range of another portion of the electromagnetic spectrum, such as the ultraviolet (UV), microwave, or X-ray spectrums. In another embodiment, at least one of the cameras 120 may be removably connected to the mobile computing device 110. For example, at least one of the cameras 120 may be connected via a cord to the mobile computing device 110. For another example, at least one of the cameras 120 may be connected wirelessly (e.g., via Bluetooth) to the mobile computing device 110. In yet another embodiment, one or more of the plurality of cameras 120 may include a fisheye lens in order to create a wide panoramic view of the vehicle 310 or a portion of the vehicle. In still another embodiment, multiple cameras 120 of the same wavelength range may be used to scan the vehicle 310 to obtain a three-dimensional, stereoscopic scan of the vehicle 310. In yet another embodiment, multiple cameras 120 with wavelengths in the same spectrum may be used. For example there may be a camera 321 operating in the "blue" portion (450-495 nm wavelength range) of the visible spectrum and another camera 322 operating in the "red" portion (620-750 nm wavelength range) of the visible spectrum. For another example, there may be a camera 321 operating in the short-wavelength or near-infrared portion (0.75-3.0 um wavelength range) of the infrared spectrum and a different camera 322 operating in the long-wavelength or far-infrared portion (8-1000 um wavelength range) of the infrared spectrum.

In some embodiments, the multispectral scan may be captured by the user of the mobile computing device 110 holding the cameras 120 and pointing it at the vehicle. The user may slowly and steadily move around the vehicle 310 in order to capture multispectral scans of multiple areas of the vehicle 310. In another embodiment, the cameras 120 may be mounted on a machine that has the ability to move around the vehicle 310 and capture a multispectral scan of all areas of the vehicle 310. The multispectral scan of the vehicle 310 may be obtained while the vehicle 310 is parked inside a building structure (e.g., a parking garage) or may be obtained while the vehicle is parked outside (e.g., a driveway or outside parking lot). Indeed, the use of a plurality of wavelengths or ranges of wavelengths enables accurate data capture under variable lighting conditions, which would otherwise limit data capture using previous techniques.

In some embodiments, after the cameras 120 capture a multispectral scan of a vehicle 310, the mobile computing device 110 may prompt the user of the mobile computing device 110 to scan another area of the vehicle 310. If the user decides to scan another area of the vehicle 310, the user may move to another area of the vehicle 310 to capture a multispectral scan of that area of the vehicle 310 (block 504). After all of the areas of the vehicle 310 that the user wants to capture scans for are scanned, the method may proceed to block 506.

At block 506, the mobile computing device 110 may generate a virtual model of the vehicle 310 in three dimensions. The virtual model of the vehicle 310 may be generated by combining each of the multispectral scans of the vehicle 310. In an embodiment, mobile computing device 110 may determine the apparent distances from the mobile computing device 110 of the plurality of data points of the vehicle 310 captured by the cameras 120. By determining the apparent distances of the plurality of data points of the vehicle 310 from the mobile computing device 110 for multiple wavelength ranges, the mobile computing device 110 may identify a divergence between apparent distances for corresponding data points in at least two different wavelength ranges of the electromagnetic spectrum. Based upon the identified divergence for corresponding data points, the data point with the shortest apparent distance from the vehicle 310 may be selected as the most accurate measurement. For example, because a window is transparent to visible light, it may be difficult to determine the location of the window in the visible spectrum. Therefore, the apparent distance of the window in the visible spectrum may be an object that is not transparent and located past the window. However, because a window is not transparent to shorter-wavelength ultraviolet radiation, the actual location of the window may be determined by the data points obtained by an ultraviolet scan of the vehicle 310. Because the actual location of the window is closer to the mobile computing device 110 than the non-transparent object past the window, the data points for the ultraviolet spectrum would be selected to designate the location of the window. In another embodiment, mobile computing device 110 may determine the intensity of signal values of the plurality of data points of the vehicle 310 captured by the cameras 120. By determining the intensity of the signal values of the plurality of data points of the vehicle 310, the mobile computing device 110 may identify data points from a specific spectrum and/or wavelength range that minimize distortion (e.g., minimizing glare), such as by using computational geometry algorithms. Based upon the selection of data points, an accurate virtual model of the damaged vehicle 310 may be generated.

At block 508, the virtual model of the damaged vehicle 310 may be presented to the user of the mobile computing device 110 via the display 202 of the mobile computing device 110. The virtual model of the damaged vehicle 310 may be presented as a visual representation of a virtual three-dimensional rendering of the vehicle 310. The user of the mobile computing device 110 may be able to view all angles of the vehicle by rotating the display 202 of the mobile computing device 110 to manipulate the orientation of the virtual model of the damaged vehicle 310. Additionally, the user may be able to zoom in on specific areas of the damaged vehicle 310. For example, zooming functionality may be implemented by sliding two fingers closer to each other or further from each other (e.g., "pinch-to-zoom") on the display 202 of the mobile computing device 110 or by other techniques.

At block 510, the mobile computing device 110 may analyze the virtual model to assess the damage to the vehicle 310. The mobile computing device 110 may analyze a cluster of data points and determine there is a dent or crack in the body of the vehicle 310 because the values of the data points in the cluster do not indicate a smooth surface on the body of the vehicle 310 when there should be a smooth surface. Additionally or alternatively, the mobile computing device 110 may have access to one or more baseline virtual models representing three-dimensional models of associated vehicles that are undamaged versions of the damaged vehicle 310. In an embodiment, the mobile computing device 110 may compare at least a portion of the virtual model of the damaged vehicle 310 to at least a portion of a baseline virtual model of an associated vehicle in order to determine where the damaged areas or components of the damaged vehicle 310 are located. For example, there may be a one-to-one correlation for each data point in a cluster of data points of the virtual model of the damaged vehicle 310 to the corresponding data point in a cluster of data points of the baseline virtual model of an associated vehicle. In an embodiment, the baseline virtual vehicle model comparison routine 246 may be utilized to facilitate the comparison of the virtual model of the damaged vehicle 310 and the baseline virtual model of an associated vehicle. In another embodiment, the mobile computing device 110 may transmit the multispectral scan of the damaged vehicle 310 to a remote server 140 via a network connection and one or more processors of the remote server 140 may perform the analysis of the virtual model to assess the damage to the vehicle 310.

At block 512, based on the comparison of the virtual model of the damaged vehicle and the baseline virtual model of the associated vehicle, the mobile computing device 110 may automatically identify one or more vehicle components associated with the corresponding clusters as the damaged vehicle components. In some embodiments, damaged areas or components of the damaged vehicle 310 may be determined by identifying one or more clusters of data points in the virtual model of the damaged vehicle 310 that differ from corresponding clusters of data points in the baseline virtual model of an associated vehicle by at least a threshold amount. There may be a threshold based upon the distance a certain component of the vehicle 310 is from the ground. For example, the bottom edge of an undamaged front bumper may be 20 cm from the ground. The threshold for this distance may be ±1 cm. So if the virtual model of the damaged vehicle 310 indicates that the edge of the bumper is 10 cm from the ground, the mobile computing device 110 may determine that the front bumper is damaged. For another example, the value of the data points from the baseline virtual model of an associated vehicle may be subtracted from the value of the corresponding data points of the virtual model of the damaged vehicle 310. The result of the subtraction may indicate certain clusters of data points that are over or under a threshold value, and thus, may be identified as a damaged area or component of the vehicle 310. In some embodiments, the remote server 140 may perform the comparison between the virtual model of the damaged vehicle 310 and the baseline virtual model of an associate vehicle and may transmit the results of the comparison to the mobile computing device 110.

At block 514, the mobile computing device 110 may optionally determine an insurance claim. Based on the comparison between the virtual model of the damaged vehicle 310 and the baseline virtual model of an associated vehicle, the extent of damage to the damaged vehicle 310 may be determined (in terms of components, repair time, repair cost, etc.). In some embodiments, the mobile computing device may determine a cost associated with the damage to the vehicle. The cost associated with the damage to the vehicle may be determined on a component-by-component basis and may include parts and labor, which may be estimated based upon known costs for similarly damaged vehicles. A total cost for all of the damaged components of the vehicle may also be determined. In some embodiments, one or more processors of the remote server 140 may determine the costs associated with the damage to the vehicle 310 and then transmit this information to the mobile computing device 310 for review and/or approval by the user.

In some aspects, an insurer may reward owners of insurance policies that utilize the functionality of assessing vehicle damage by generating a virtual model of the damaged vehicle 310. By using this functionality, owners of insurance policies save time and money that would have been spent waiting for an insurance agent or adjuster to take pictures of the damaged vehicle 310, assess the vehicle damage, determine costs associated with repairing the damaged vehicle 310 or if the vehicle 310 should be deemed a total loss, etc. Therefore, an insurer may reward owners of insurance policies that use this functionality by offering them a discount in insurance premiums, discounts on repairs to a damaged vehicle, faster processing and payment of claims, etc.

At block 516, the display 202 of the mobile computing device 110 may optionally present an indication of the insurance claim to the user for review or approval (such as the exemplary display illustrated in FIG. 4B). Upon approval, the claim may be processed and payment made. The display 202 of the mobile computing device 110 may present a listing of the damaged vehicle components and the cost associated with the repair or replacement of each component. The total cost of the damages to the vehicle 300 may also be displayed. Additionally, the user of the mobile computing device 110 may be presented with the option to proceed with the claim or not proceed. If the user selects an option to proceed, the insurance claim may be further processed, either automatically or manually.

Additional Considerations

As used herein, the term "vehicle" refers to any type of powered transportation device, which includes, but is not limited to, a car, truck, bus, motorcycle, plane, or boat—including fully or partially self-driving (i.e., autonomous or semi-autonomous) vehicles. While a vehicle may be described herein as being controlled by an operator or insured individual, the aspects described herein also apply to autonomous vehicles that may be unmanned and/or operated remotely or in another suitable fashion, such as via controls other than the steering wheel, gear shift, brake pedal, and accelerator pedal.

With the foregoing, an insurance customer may opt-in to a rewards, insurance discount, or other type of program. After the insurance customer provides their affirmative consent, an insurance provider remote server may collect data from the customer's mobile device, on-board vehicle computer, or other devices—such as with the customer's permission or affirmative consent. The data collected may be related to vehicle functionality (or vehicle occupant preferences or preference profiles) or vehicle operation, and/or insured assets before (and/or after) an insurance-related event, including those events discussed elsewhere herein. In return, risk-averse insureds, vehicle owners, or vehicle occupants may receive discounts or insurance cost savings related to auto insurance, as well as home, renters, personal articles, and other types of insurance from the insurance provider.

In one aspect, smart or interconnected vehicle data, and/or other data, including the types of data discussed elsewhere herein, may be collected or received by an insurance provider remote server, such as via direct or indirect wireless communication or data transmission from an on-board vehicle computer, mobile device, or other customer computing device, after a customer affirmatively consents or otherwise opts-in to an insurance discount, reward, or other program. The insurance provider may then analyze the data received with the customer's permission to provide benefits to the customer. As a result, risk-averse customers may receive insurance discounts or other insurance cost savings based upon data that reflects low risk behavior and/or technology that mitigates or prevents risk to (i) insured assets, such as homes, personal belongings, or vehicles, and/or (ii) vehicle, home, or apartment occupants.

This detailed description is to be construed as exemplary only and does not describe every possible embodiment, as describing every possible embodiment would be impractical, if not impossible. One may implement numerous alternate embodiments, using either current technology or technology developed after the filing date of this application.

Furthermore, although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the terms "coupled," "connected," "communicatively connected," or "communicatively coupled," along with their derivatives. These terms may refer to a direct physical connection or to an indirect (physical or communication) connection. For example, some embodiments may be described using the term "coupled" to indicate that two or more elements are in direct physical or electrical contact. The term "coupled," however, may also mean that two or more elements are not in direct contact with each other, but yet still co-operate or interact with each other. Unless expressly stated or required by the context of their use, the embodiments are not limited to direct connection.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless the context clearly indicates otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

Finally, the patent claims at the end of this patent application are not intended to be construed under 35 U.S.C. § 112(f), unless traditional means-plus-function language is expressly recited, such as "means for" or "step for" language being explicitly recited in the claims. The systems and methods described herein are directed to an improvement to computer functionality, and improve the functioning of conventional computers.

What is claimed is:

1. A computer-implemented method of generating a three-dimensional representation of a vehicle to assess damage to the vehicle, comprising:
   determining, by a sensor associated with a mobile device, a level of ambient illumination in a first wavelength range, wherein an environment in which the vehicle is currently disposed is characterized by at least the first wavelength range;
   determining, by a processor operably connected to the sensor, that the level of ambient illumination is less than a threshold level of illumination;
   based on determining that the level of ambient illumination is less than the threshold level, emitting, by an illuminator operably connected to the processor, radiation in a second wavelength range, the second wavelength range at least partly overlapping with the first wavelength range;
   during emission of the radiation, capturing, with the sensor, a plurality of data points corresponding to the vehicle and within at least the first wavelength range;
   generating, by the processor and based on the plurality of data points, a three-dimensional virtual model of the vehicle; and
   determining, by the processor, damage to the vehicle based on the three-dimensional virtual model.

2. The computer-implemented method of claim 1, wherein the first wavelength range is within a mid-infrared spectrum or a far-infrared spectrum, and at least a first subset of the plurality of data points corresponds to a glass component of the vehicle.

3. The computer-implemented method of claim 2, wherein the damage to the vehicle is determined based at least in part on the first subset of the plurality of data points.

4. The computer-implemented method of claim 2, wherein determining the damage to the vehicle further comprises:
   comparing the first subset of data points to at least a portion of a three-dimensional virtual model representing glass components of an associated vehicle without damage; and
   determining a first damage associated with the first subset of data points.

5. The computer-implemented method of claim 1, wherein the second wavelength range is within an infrared spectrum.

6. The computer-implemented method of claim 1, wherein the sensor captures the plurality of data points within a third wavelength range different from the first wavelength range.

7. The computer-implemented method of claim 1, further comprising:
   determining, by an additional sensor, at least one of a location of an object disposed in the environment, and a shape of the object, wherein the damage to the vehicle is determined based at least in part on the at least one of the location and the shape.

8. The computer-implemented method of claim 7, wherein the additional sensor comprises a camera of the mobile device.

9. The computer-implemented method of claim 4, further comprising:
   determining, by the processor, a cost associated with the first damage; and
   generating, by the processor, at least part of an insurance claim based at least in part on the cost.

10. A system, comprising:
    a processor;
    a sensor operably connected to the processor;
    an illuminator operably connected to the processor; and
    a non-transitory program memory storing instructions that, when executed by the processor, cause the processor to:
       cause the sensor to determine a level of ambient illumination in a first wavelength range, wherein an environment in which a structure is disposed is characterized by at least the first wavelength range;
       determine that the level of ambient illumination is less than a threshold level of illumination;

based on determining that the level of ambient illumination is less than the threshold level, cause the illuminator to emit radiation in a second wavelength range, the second wavelength range at least partly overlapping with the first wavelength range;

during emission of the radiation, cause the sensor to determine a plurality of data points corresponding to the structure and within at least the first wavelength range;

generate, based on the plurality of data points, a three-dimensional virtual model of the structure; and determine damage to the structure based on the three-dimensional virtual model.

11. The system of claim 10, wherein the first wavelength range is within a mid-infrared spectrum or a far-infrared spectrum, and at least a first subset of the plurality of data points corresponds to a glass component of the structure.

12. The system of claim 10, wherein the second wavelength range is in an infrared range.

13. The system of claim 11, wherein the instructions further cause the processor to:
compare the first subset of data points to at least a portion of a three-dimensional virtual model representing glass components of the structure before damage; and
determine a first damage associated with the first subset of data points based on the comparing.

14. The system of claim 13, wherein the instructions further cause the processor to:
determine a cost associated with the first damage; and
generate at least part of an insurance claim based at least in part on the cost.

15. The system of claim 10, wherein:
the sensor comprises a plurality of sensors; and
at least one sensor of the plurality of sensors is removably connected to a mobile device.

16. The system claim 10, wherein:
the sensor comprises a plurality of sensors; and
at least one sensor of the plurality of sensors is configured to capture the plurality of data points using at least two different wavelength ranges of the electromagnetic spectrum.

17. A tangible, non-transitory computer-readable medium storing executable instructions that, when executed by a processor of a system, cause the processor to:

receive, from a sensor operably connected to the processor, information indicating a level of ambient illumination, in a first wavelength range, of an environment in which a vehicle is disposed;

determine that the level of ambient illumination is less than a threshold level of illumination;

based on determining that the level of ambient illumination is less than the threshold level, cause an illuminator operably connected to the processor to emit radiation in a second wavelength range, the second wavelength range at least partly overlapping with the first wavelength range;

during emission of the radiation, cause the sensor to determine a plurality of data points corresponding to the vehicle and within the first wavelength range;

generate a three-dimensional virtual model of the vehicle based on the plurality of data points; and determine damage to the vehicle based on the three-dimensional virtual model.

18. The tangible, non-transitory computer-readable medium of claim 17, wherein the first wavelength range is within a mid-infrared spectrum or a far-infrared spectrum, and at least a first subset of the plurality of data points corresponds to a glass component of the vehicle.

19. The tangible, non-transitory computer-readable medium of claim 18, wherein the executable instructions further cause the processor to:
identify a difference between at least the first subset of the data points and at least a first portion of a baseline virtual model, the baseline virtual model comprising a three-dimensional model of an associated vehicle without damage; and
determine the damage based at least in part on the difference.

20. The tangible, non-transitory computer-readable medium of claim 19, wherein the executable instructions further cause the processor to:
determine a cost associated with the damage; and
generate at least part of an insurance claim based at least in part on the cost.

* * * * *